United States Patent [19]

Hashimoto et al.

[11] Patent Number: 4,561,071
[45] Date of Patent: Dec. 24, 1985

[54] STORAGE SYSTEM HAVING BUFFER STORAGE

[75] Inventors: Noriaki Hashimoto; Kanji Kubo; Chikahiko Izumi, all of Hadano, Japan

[73] Assignee: Hitachi, Ltd., Tokyo, Japan

[21] Appl. No.: 519,699

[22] Filed: Aug. 2, 1983

[30] Foreign Application Priority Data

Aug. 9, 1982 [JP] Japan .............................. 57-138099

[51] Int. Cl.[4] .............................................. G11C 11/40
[52] U.S. Cl. ...................................... 365/230; 365/189
[58] Field of Search ............... 365/189, 190, 191, 230, 365/231, 233

[56] References Cited

U.S. PATENT DOCUMENTS 4,419,746 12/1983 Hunter et al. ...................... 365/230

Primary Examiner—Terrell W. Fears
Attorney, Agent, or Firm—Antonelli, Terry & Wands

[57] ABSTRACT

This storage system is designed to refer to a translation lookaside buffer, a buffer address array and a buffer storage in parallel. The translation lookaside buffer translates a logical address requesting memory access into a real address. The buffer storage retains part of the data retained in blocks by main storage and outputs data from M blocks in accordance with the logical address to M aligners. The buffer address array retains the addresses in MS of the data stored in each of the blocks in the buffer storage, and outputs M addresses in accordance with the logical address. A comparator compares the real addresses from the translation lookaside buffer with the addresses from the buffer address array, selects one of the outputs from the aligners, and transfers that output to a processor.

4 Claims, 5 Drawing Figures

STORAGE SYSTEM HAVING BUFFER STORAGE

BACKGROUND OF THE INVENTION

This invention relates to a storage system having a memory hierarchy for a data processor with virtual storage.

A storage system having a memory hierarachy is provided with a main storage and a buffer storage. The buffer storage is adapted to retain as a copy part of the data kept in the main storage. The capacity of the buffer storage is low compared to that of the main storage MS, but it operates at a higher speed than the main storage, and is capable of accessing at high speed the data required in a processor. Methods of controlling the buffer storage include an associative register method and a set associative method (which is also called a "congruent method"). The set associative method, which has a higher use efficiency, is employed in most cases.

FIG. 1 shows the relationship between the buffer storage BS and the main storage MS in the set associative system. In the example shown in FIG. 1, the buffer storage BS is divided into columns 0–127, each of which consists of four blocks or rows. One row consists, for example, of 32 bytes, and is capable of storing 32 successive bytes of data in the main storage MS. The main storage MS is divided logically into the same number of columns as the buffer storage BS and the number of rows in each column in the main storage MS is determined by the memory capacity thereof. If the main storage MS has a capacity of four megabytes (4096KB), as shown in FIG. 1, each column has 1024 rows and each row consists of 32 bytes. The data stored in one of the four rows in the corresponding column in the buffer storage BS. The main storage address, which is not shown in FIG. 1, of an effective data block stored in the buffer storage BS is retained in a buffer address array BAA, which has the same construction as the buffer storage BS. The number of storage areas in the buffer address array BAA is the same as the number of rows in the buffer storage BS.

A data processing system with a memory hierarchy employs a virtual memory to give the programmer freedom to prepare a program which is larger than the capacity of the main storage MS. Virtual storage in practice consists of a main storage MS and an auxiliary storage AS. These storage areas are divided into units called pages, for example, of 2 KB, and the contents of the storages are swapped on the basis of these units. Some of the pages of a virtual storage are in main storage MS, and the remaining pages, which cannot be held in MS, are in auxiliary storage AS. The pages in auxiliary storage AS are read into (paged in) the main storage MS when needed, and written out (paged out) to auxiliary storage AS when they are not needed.

In a data processing system with virtual storage, a program is written by its address (logical address) in the virtual storage. Accordingly, the logical address is translated by the processor into a processable address (real address) in the main storage MS. The translation of a logical address into a real address is done by a dynamic address translation mechanism, which includes a translation lookaside buffer TLB for retaining address translation pairs each consisting of a logical address and a real address corresponding thereto, for the purpose of executing an efficient address translation.

In the basic operation of a storage system employing both virtual storage and buffer storage, it is necessary initially to ascertain that the real address corresponding to a memory reference logical address is retained by the translation lookaside buffer TLB. When the real address is retained by the translation lookaside buffer TLB, the real address is obtained immediately therefrom. It is then necessary to ascertain that the real address is retained by the buffer address array BAA. When the real address is retained by the buffer address array BAA, the buffer storage BS is accessed to obtain the desired data. However, as is apparent, this two-step procedure requires an undesirably-lengthy access time.

Some conventional methods have been developed with a view to shortening the access time, including a method which provides for referencing the translation lookaside buffer TLB and the buffer address array BAA in parallel and thereafter referencing the buffer storage BS, and a method in which the translation lookaside buffer TLB, buffer address array BAA and the buffer storage BS are all referenced in parallel. These methods are disclosed in U.S. Pat. No. 3,761,881 and Japanese Patent Application No. 28341/1977.

FIG. 2 shows a storage system in which the translation lookaside buffer TLB, the buffer address array BAA and the buffer storage BS are referenced in parallel. Referring to FIG. 2, reference numeral 1 denotes a logical address register LAR, an output from which forms the reference addresses applied to a translation lookaside buffer TLB 2, a buffer address array BAA 3 and a buffer storage BS 6. The translation lookaside buffer TLB 2 translates a logical address on a line 11 into a real address and sets that real address in a register TLBR 20. The real address set in the register TLBR 20 is sent to a comparator circuit 4 over a line 12.

The buffer address array BAA 3 stores therein real addresses representing the position in main storage MS of the data buffered in the buffer storage BS 6. However, certain bits of each real address are identical to certain bits of the corresponding logical address. On this basis, it is possible to read out the real addresses from the buffer address array BAA 3 designated by the logical address received from the logical address register LAR 41 and set these addresses in a register 21. These real addresses are then sent to the comparator circuit 4 over a line 13. The comparator circuit 4 compares the real addresses on the lines 12, 13 and when these real addresses agree with each other, it indicates that the data required by the processor is in the buffer store BS 6. This is called the "IN-BS state".

In the buffer storage BS in a set associative system having N columns×M rows, a plurality (M) of rows in the corresponding column in the buffer address array BAA 3 are read out simultaneously and input to the comparator circuit 4 over the line 13. When an IN-BS condition has been determined in the comparator circuit 4, the row number agreeing with the real address on the line 12 is set in a row number register 24 by the comparator circuit.

At the same time, the buffer storage BS 6 is accessed by an address set in a BS address register BSAR 5 by the logical address register LAR 1. A block, the unit of data registered in the buffer storage BS 6, is generally divided into L banks. For ease of explanation, if L is 2, 1 block is divided into an even bank and an odd bank. In this case, the data read out from the buffer storage BS 6 accessed by the address in the buffer storage address register BSAR 5 has a width of sixteen bytes. Of the data read out from the buffer storage BS 6, the eight bytes of data with even-numbered block addresses are set in a data register (BDR (E)) 7, and the eight bytes of data with odd-numbered block addresses in a data register (BDR (O)) 8. A number M BDRs 7, 8 are provided corresponding to the rows in the buffer storage BS 6, and the data in M rows in the column designated by the buffer storage address register BSAR 5 are read out. A selector 23 selects one of the data registers BDR 7, 8 corresponding to the row number designated by the row number register ROWR 24, and transfers 16 bytes of data to an aligner 9. The aligner 9 left-shifts or right-shifts the sixteen bytes of data in accordance with the address and outputs eight bytes of data required by the processor. The eight bytes of data from the aligner 9 are set in a fetch data register FDR 10 and transferred to the processor. An example of the aligner used is disclosed in Japaense Patent Laid-Open No. 94133/1978.

FIG. 3 is a timing chart of the operation of the storage system shown in FIG. 2. To simplify the explanation let $n_i$ be a stage corresponding to one machine cycle. A starting point, at which a logical address has been set in the logical address register LAR 1, is the "$n_0$ stage", and the following stages are "$n_1, n_2 \ldots$". The timing operations are carried out in two phases $T_0, T_1$ within one machine cycle. Referring to FIG. 3, the translation lookaside buffer TLB 2 and the buffer address array BAA 3 are read in parallel in accordance with a logical address in the logical address register LAR 1, real addresses are compared in the comparator 4, and a row number is then set in the row number register ROWR 24. These operations are carried out during two machine cycles. Data read from the buffer storage BS is set in the data regiser BDR 1.5 cycles after the starting point.

Referring to FIG. 3, the time $t_1$ required to determine the row number of the buffer storage BS on the basis of the results obtained from the translation lookaside buffer TLB and the buffer address array BAA, which are referenced in parallel, becomes longer than the time $t_2$ required to verify the data from the buffer storage BS, the reading of which starts at the same time. The buffer storage reference time with respect to the operation of the processor is determined on the basis of the time $t_1$. After the row number of the buffer storage BS has been determined by the row number register ROWR 24, sixteen bytes of the buffer storage BS reading data corresponding to the row number are transferred to the aligner 9 by a selector 23. After the data has been aligned, the required eight bytes of data are set in a fetch data register FDR 10. Thus, it takes 2.5 machine cycles (MC) after a logical address has been set in the logical address register LAR 1 to set the required data in the fetch data register FDR 10.

SUMMARY OF THE INVENTION

An object of the present invention is to provide a storage system capable of increasing the buffer storage reading speed with respect to the operation of a processor.

According to the present invention, a table lookaside buffer, a buffer address array and a buffer storage are referenced in parallel. The buffer storage outputs data from M blocks in accordance with a logical address. The data from the M blocks is input to M aligners, each of which aligns the corresponding data. In the meantime, a selection signal is output from a selection signal generation circuit in accordance with a real address output from the table lookaside buffer and addresses output from the buffer address array and one of the outputs from the M aligners is selected by a selector in accordance with the selection signal.

DESCRIPTION OF THE PREFERRED EMBODIMENT

Figure 4:
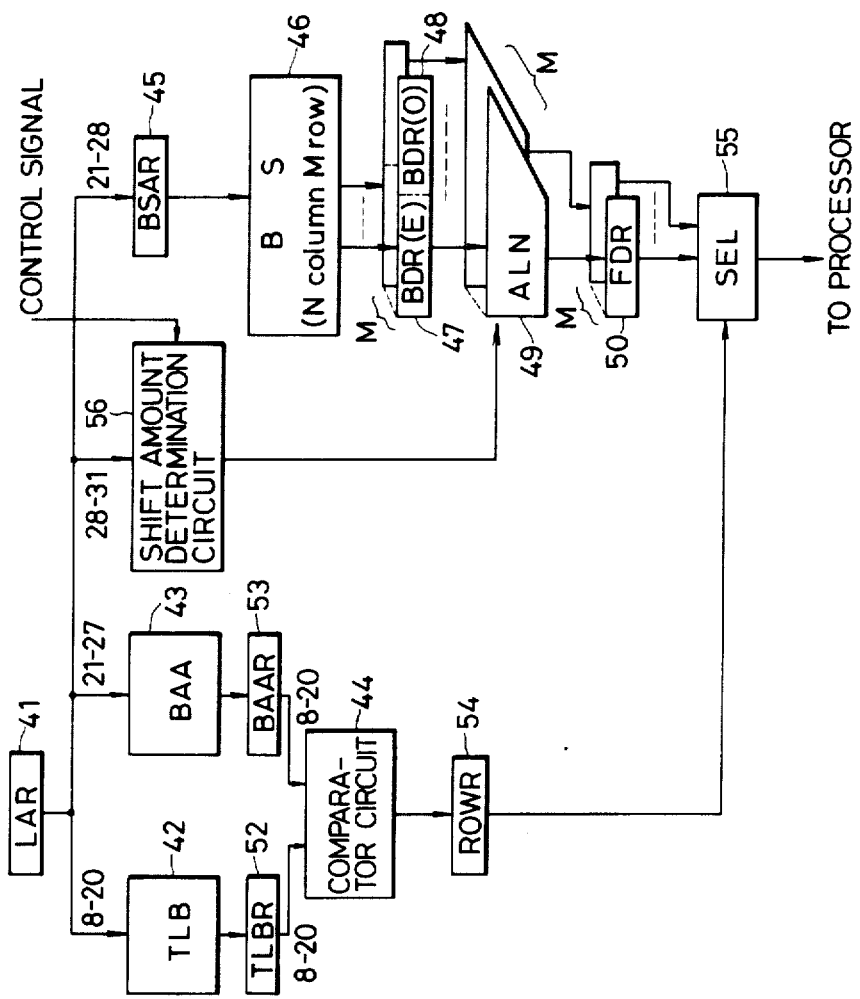
FIG. 4 is a block diagram of an embodiment of the present invention.
Figure 5:
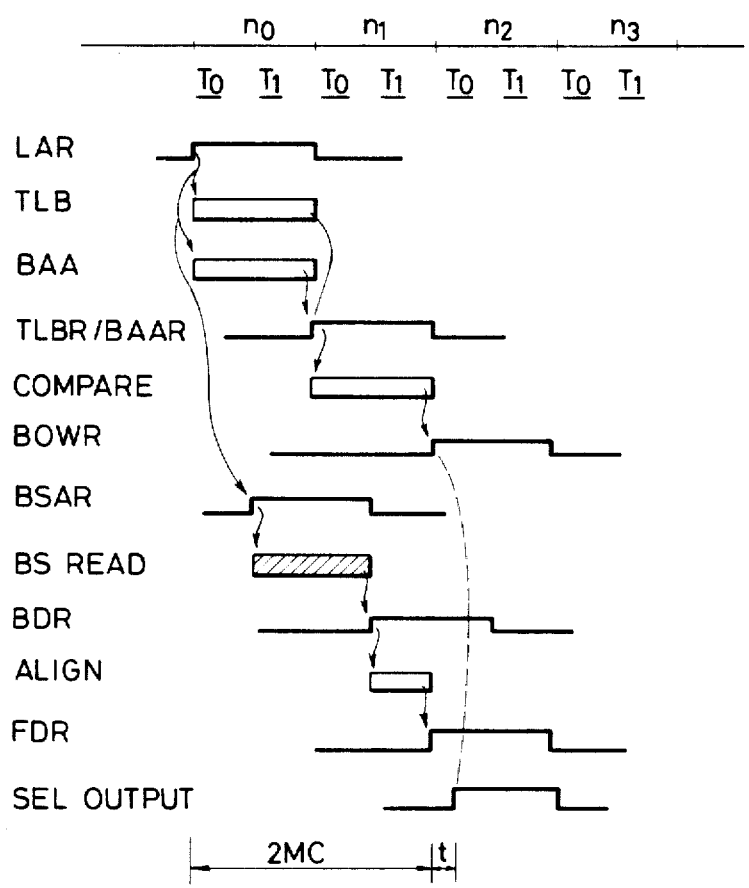
FIG. 5 is a timing chart of the operation of the embodiment of FIG. 4.

FIG. 4 is a block diagram of an embodiment of the present invention, and FIG. 5 is a timing chart of the operation of the embodiment of FIG. 4.

Referring to FIG. 4, a logical address LA requiring memory access is set in a logical address register LAR 41. The address is, for example, 24 bits long, the positions of which are represented by bits 8–31. If the page size is 2KB, bits 8–20 are a page address. The logical address and real address RA within the page of bits 21–31 agree with one another.

A logical address set in the logical address register LAR 41 is applied to a buffer storage address register BSAR 45, an address register for a translation lookaside buffer TLB 42, a buffer address array BAA 43 and a buffer storage BS 46. The logical address is also applied to a shift amount determination circuit 56, which will be described later. Bits 8–20 indicated are applied to the translation lookaside buffer TLB 42, from which one or more real addresses (bits 8–20) corresponding to the applied logical address are output to a register TLBR 52. Bits 21–27 are applied to the buffer address array BAA 43, from which M real addresses (bits 8–20 ) are output to a register BAAR 53. A comparator circuit 44 compares the real addresses in the register TLBR 52 with the M real addresses in the register BAAR 53. When these real addresses agree with each other, the row numbers corresponding to the real addresses from the register BAAR 53 are set in a row number register ROWR 54. When no real addresses agree with each other, it means that the data required is not in buffer storage BS. If this happens, transfer of a block of data from the main storage MS to the buffer storage BS is started by a known method. This has no direct relationship with the present invention, and will not be described in detail.

Bits 21–28 are applied to the buffer storage address register BSAR 45. The buffer storage BS 46 consists of N columns × M rows. For example, N=128, M=4 and each block size is 32 bytes. The buffer storage BS 46 selects one column by utilizing bits 21–27 as a column address, selects sixteen bytes of data in a block by bit 28 and reads it into buffer data registers BDR 47, 48 provided correspondingly to each row. The buffer storage BS 46 has two banks in the same way as stated in the description of FIG. 2. In the buffer storage BS 46, eight bytes of data from the even-numbered bank are read into the buffer data register BDR 47, and eight bytes of data from the odd-numbered bank are read into the buffer data register BDR 48.

The characteristic of this embodiment resides in at M (=4) aligners 49 are provided corresponding to the respective rows in the buffer storage BS, and these aligners receive sixteen bytes of data from their corresponding buffer data register BDR 47, 48. The aligners 49 have the same construction, and they function to align sixteen bytes of input data in accordance with a shift order from the shift amount determination circuit 56 and set the eight bytes of data required by the processor in the corresponding fetch data register FDR 50.

The shift amount determination circuit 56 determines a shift amount in response to bits 28-31 of the address and a control signal applied from the processor thereto, in such a manner that the data byte designated by bits 28-31 is positioned as the extreme left-hand byte or the extreme right-hand byte in the eight bytes of data output from the aligners 49. The control signal includes an instruction code and other types of signal, such as a decimal arithmetic instruction representing the least significant byte as an operand address. In this case, a right shift is ordered so that the byte designated by bits 28-31 of the address is positioned as the extreme right-hand byte (least significant digit) of the eight bytes of data output from the aligners 49. When an instruction other than a decimal arithmetic instruction is given, a left shift is ordered so that the byte designated by bits 28-31 of the address is positioned as the extreme left-hand byte (most significant digit) in the eight bytes of data output from the aligners 49. The shift direction and amount from the shift amount determination circuit 56 are applied to the M aligners 49, in which the same alignment operations are carried out.

A selector 55 selects one of the items of data in the fetch data register FDR 50 in accordance with the row number received from the row number register ROWR 54 and transfers the selected eight bytes of data to the processor.

Referring to FIG. 5, the table lookaside buffer TLB 42 and the buffer address array BAA 43 are read in parallel in accordance with a logical address in the logical address register LAR 41-set at $T_0$ in the $n_0$ stage, and the read data is set in the registers TLBR 52 and BAAR 53 at $T_0$ in the $n_1$ stage. The outputs from the registers TLBR 52 and BAAR 53 are input to the comparator circuit 44. Consequently, when data required by the processor is in the buffer storage BS 46, the row number thereof is set in the row number register ROWR 54 at $T_0$ in the $n_2$ stage.

The buffer BS 46 is read in accordance with an address in the buffer storage address register BSAR 45 set at $T_1$ in the $n_0$ stage, and the data read from the buffer storage BS 46 is set in M buffer data registers BDR (E) 47 and BDRs (O) 48 at $T_1$ in the $n_1$ stage. The outputs from M aligners 49 are set in M fetch data registers FDR 50 at $T_0$ in the $n_2$ stage. The outputs from the M fetch data registers FDR 50 are input to a selector 55, an output from the fetch data register FDR which corresponds to the required row, from the M fetch data registers FDR 50, is selected in accordance with a row number designated by the row number register ROWR 54, and the output is then transferred to the processor.

Referring to the timing chart of FIG. 5, an address is set in the logical address register LAR 1, the buffer storage BS 46 is then read to align the fetched data therein, and the data is set in the fetch data registers FDR 50. It takes 2MC to complete these operations. It takes a period of time t to transfer the data set in the fetch data register FDR 50 to an output terminal of the selector 55. If the selector is inserted into an output buffer gate for a data bus connected to the processor (this assumption is valid if the number of rows is small), in contrast with the selector in the conventional system of FIG. 2, it does not increase the delay between fetch data register and processor.

Figure 1:
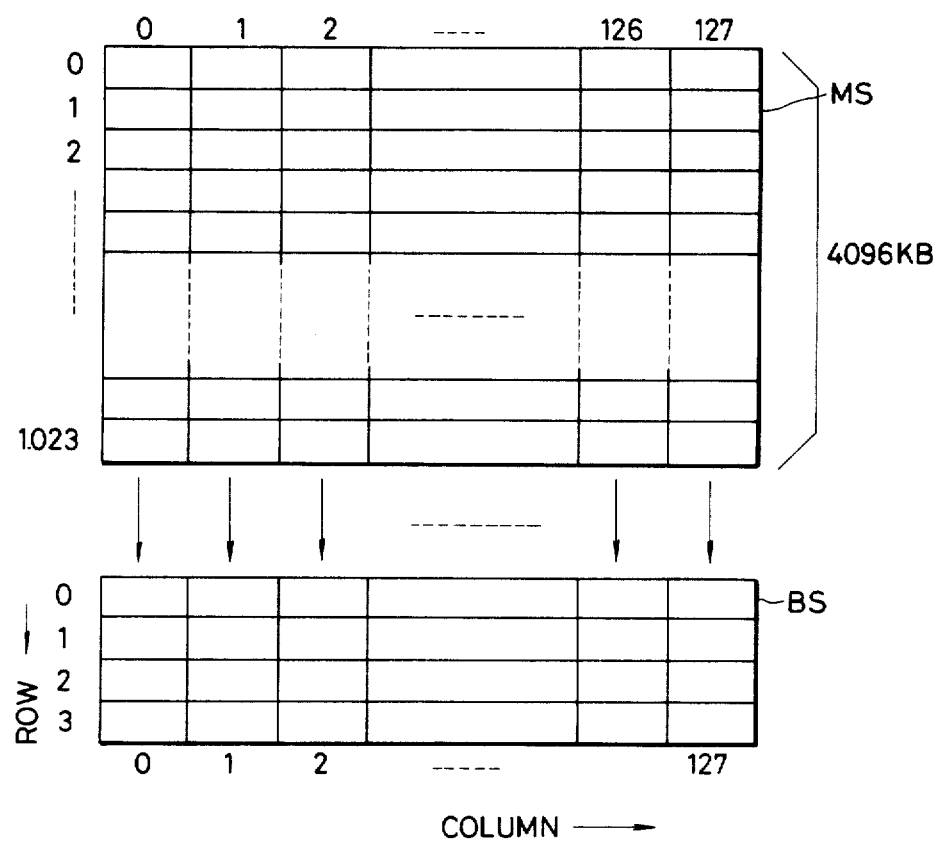
FIG. 1 is a diagram showing the relationship between the main storage and the buffer storage.
Figure 2:
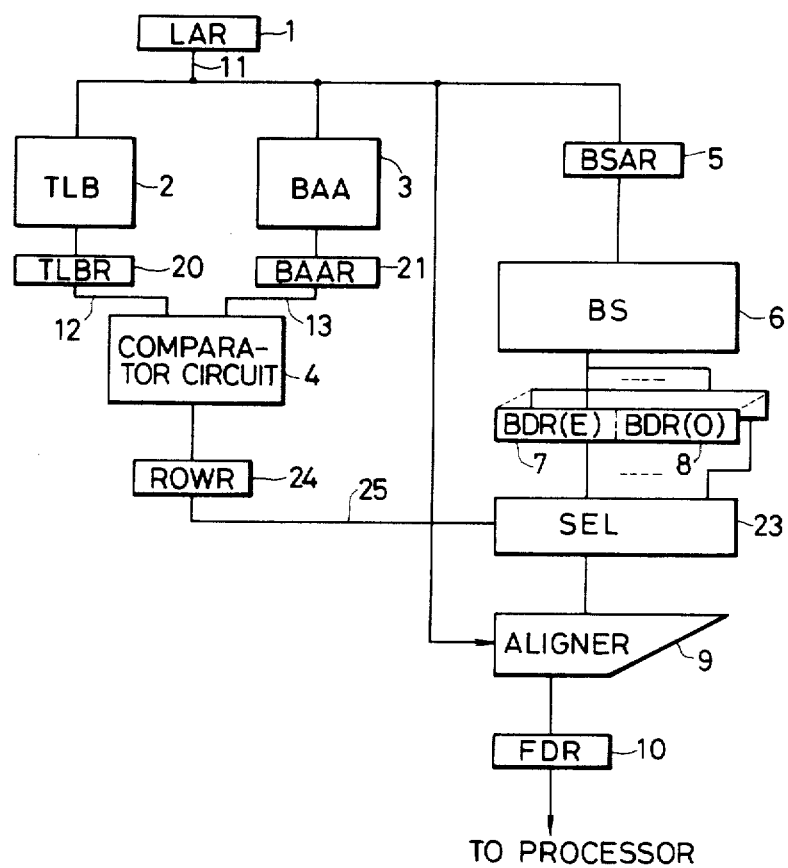
FIG. 2 is a block diagram of a conventional storage system.
Figure 3:
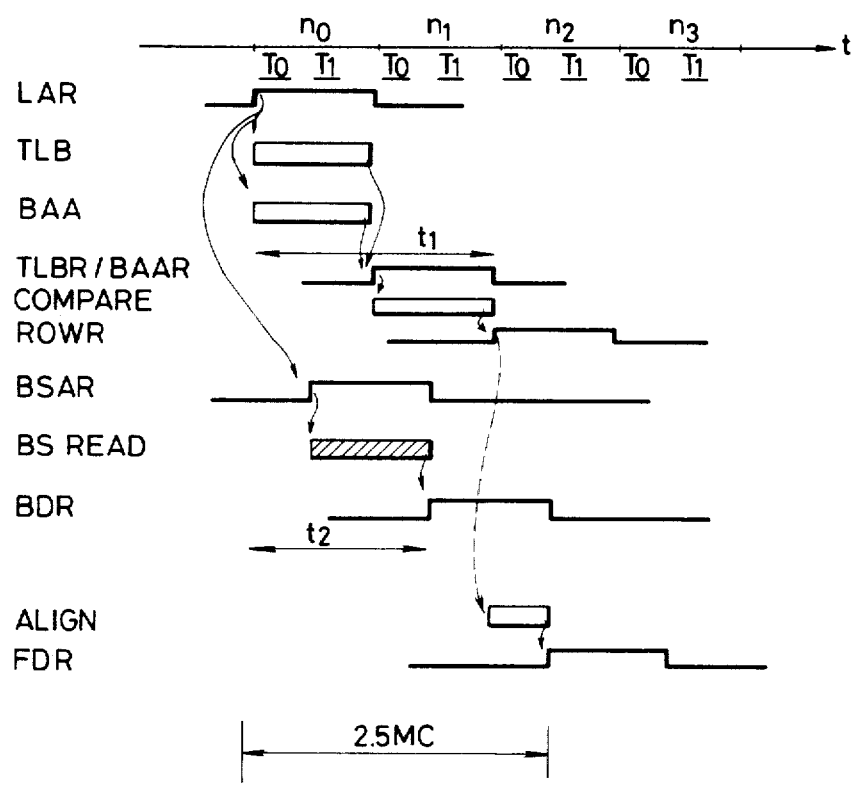
FIG. 3 is a timing chart of the operation of the storage system of FIG. 2.

Therefore, the time required for carrying out an operation between the logical address register LAR and the fetch data register FDR in the conventional storage system shown in FIG. 2 is 2.5 MC, the time required for carrying out the same operation in the embodiment described above is 2MC.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A storage system having main storage means for storing data, and buffer storage means for retaining as a copy part of the data retained by said main storage means, and means for fetching data from said buffer storage means in response to a logical address, comprising register means for storing said logical address; means connected to said register means for translating said logical address set in said logical address register means into a real address; said buffer storage means including means connected to said register means for retaining data in blocks and for outputting data from M blocks ($M \geq 2$) in response to receipt of said logical address from said logical address register means; M aligning means connected to said buffer storage means for aligning the data in each block output from said buffer storage means in accordance with said logical address; buffer address array means connected to said register means for retaining the addresses in said main storage means of the data stored in the blocks in said buffer storage means and for outputting M addresses in accordance with said logical address; selection signal generation means connected to said buffer address array means and said translating means for outputting a selection signal in accordance with the real address output from said address translating means and the addresses output from said buffer address array means; and means connected to said aligning means and said selection signal generation means for selecting one of outputs from said aligning means in accordance with said selection signal from said selection signal generation means.

2. A storage system according to claim 1 wherein said buffer storage means has N columns × M rows and is adapted to output data within a block of M rows belonging to the column designated by a column address which constitutes part of said logical address in said logical address register means.

3. A storage system according to claim 2 wherein said buffer address array means has N columns × M rows of entries correspondingly to blocks in said buffer storage means, and includes means for outputting addresses from M rows of entries belonging to a column designated by a column address which constitutes part of said logical address in said logical address register means.

4. A storage system according to claim 3 wherein said selection signal generation means includes means for outputting the selection signal representative of a row corresponding to the real address received from said address translating means and addresses received from said buffer address array means in response to detection that the received addresses agree with each other.

* * * * *